United States Patent [19]

Bannai et al.

[11] Patent Number: 5,457,579
[45] Date of Patent: Oct. 10, 1995

[54] APPARATUS FOR RECORDING EACH EDITING UNIT OF VIDEO AND AUDIO SIGNALS IN AN ISOLATED AREA ON A RECORDING MEDIUM

[75] Inventors: Tatsushi Bannai, Sakai; Hideaki Shibata, Osaka; Masamitsu Ohtsu, Moriguchi; Hiroshi Okamoto, Nara, all of Japan

[73] Assignee: Matsushita Electric Industrial Co., Ltd., Osaka, Japan

[21] Appl. No.: 173,477

[22] Filed: Dec. 27, 1993

Related U.S. Application Data

[63] Continuation of Ser. No. 729,582, Jul. 15, 1991, abandoned.

[30] Foreign Application Priority Data

Jul. 16, 1990 [JP] Japan ................................ 2-189072

[51] Int. Cl.⁶ ..................................................... G11B 5/02
[52] U.S. Cl. ............................. 360/19.1; 360/64; 358/341
[58] Field of Search ............................... 358/341; 360/18, 360/19.1, 32, 33.1, 64

[56] References Cited

U.S. PATENT DOCUMENTS

| | | | |
|---|---|---|---|
| 4,071,856 | 1/1978 | Kihara et al. | 360/64 |
| 4,303,950 | 12/1981 | Taniguchi et al. | 360/8 |
| 4,390,906 | 6/1983 | Furumoto et al. | 360/19.1 |
| 4,453,186 | 6/1984 | Watatani et al. | 360/19.1 |
| 4,463,387 | 7/1984 | Hashimoto et al. | 360/32 |
| 4,532,556 | 7/1985 | Gundry | 360/19.1 |
| 4,533,963 | 8/1985 | Nakano et al. | 360/19.1 |
| 4,660,103 | 4/1987 | Wilkinson et al. | 360/18 |
| 4,819,089 | 4/1989 | Wilkinson et al. | 360/19.1 |
| 5,123,006 | 6/1992 | Lemelson | 360/18 |

FOREIGN PATENT DOCUMENTS

| | | |
|---|---|---|
| 0393207 | 10/1990 | European Pat. Off. . |
| 3515251 | 11/1986 | Germany . |
| 1-106382 | 4/1989 | Japan . |
| 2-214001 | 8/1990 | Japan . |
| 7108855 | 12/1971 | Netherlands . |

OTHER PUBLICATIONS

Patent Abstracts of Japan, vol. 8, No. 072 (P-265) 4 Apr. 1984.

Primary Examiner—Edward P. Westin
Assistant Examiner—Benjamin D. Driscoll
Attorney, Agent, or Firm—Wenderoth, Lind & Ponack

[57] ABSTRACT

A video and audio signal recording apparatus for recording video and audio signals on parallel tracks formed on a recording medium, includes: a divider for dividing a video signal into video signal blocks each contained in a unit period which is N times (N=1, 2, . . .) as long as one field period of the video signal; another divider for dividing an audio signal into audio signal blocks each contained in a specific period which is synchronized with the unit period; and a recorder for recording signal contained in each of said video signal and audio signal blocks in each of fully independent areas on the recording medium such that any two of the fully independent areas adjacent to each other in a track width direction are separated from each other by an unrecorded area composed of L unrecorded consecutive tracks (L=1, 2, . . .) and any two of the fully independent areas adjacent to each other in a track length direction are separated from each other by an unrecorded area having a specific length in the track length direction.

8 Claims, 9 Drawing Sheets

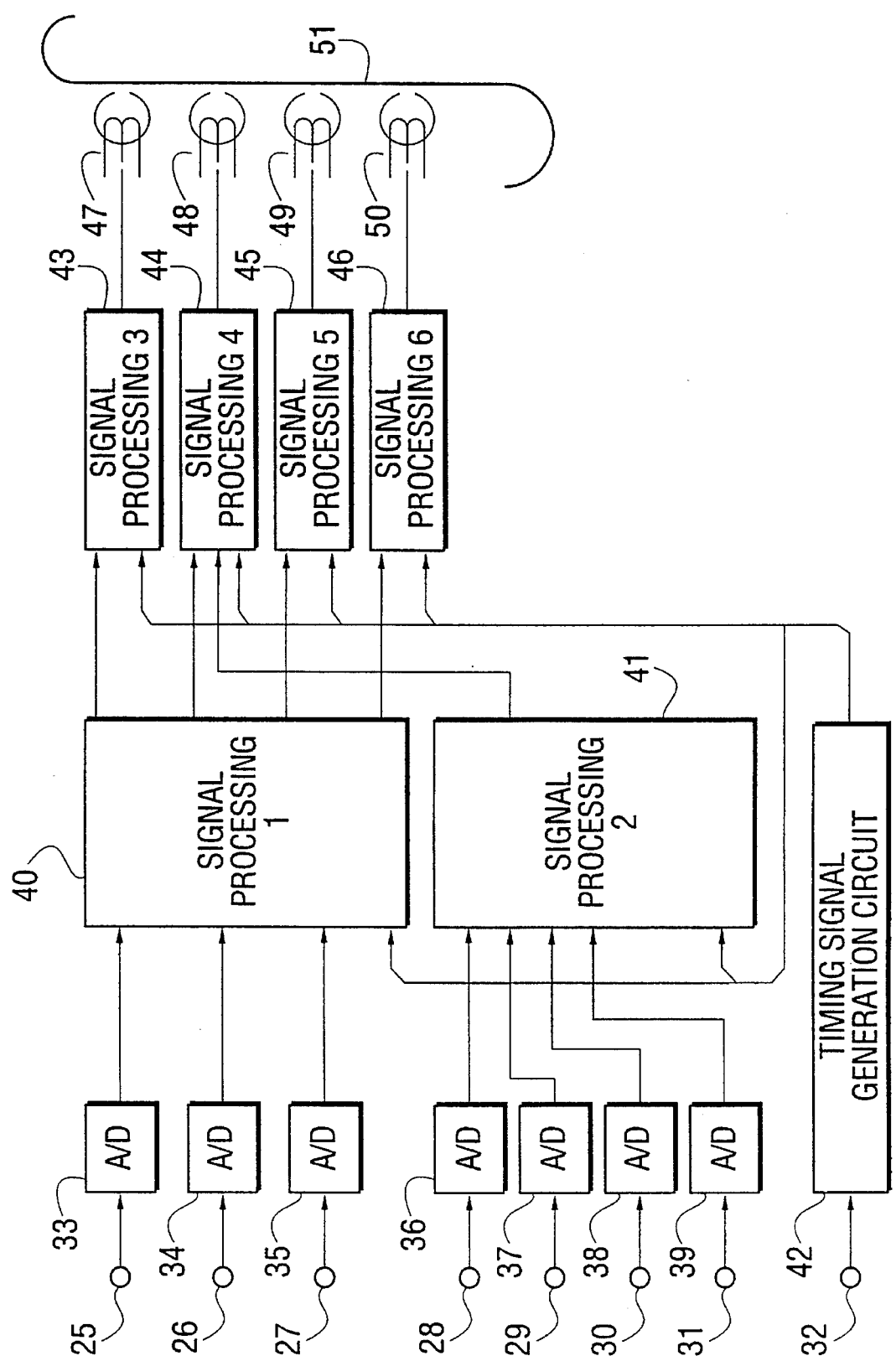

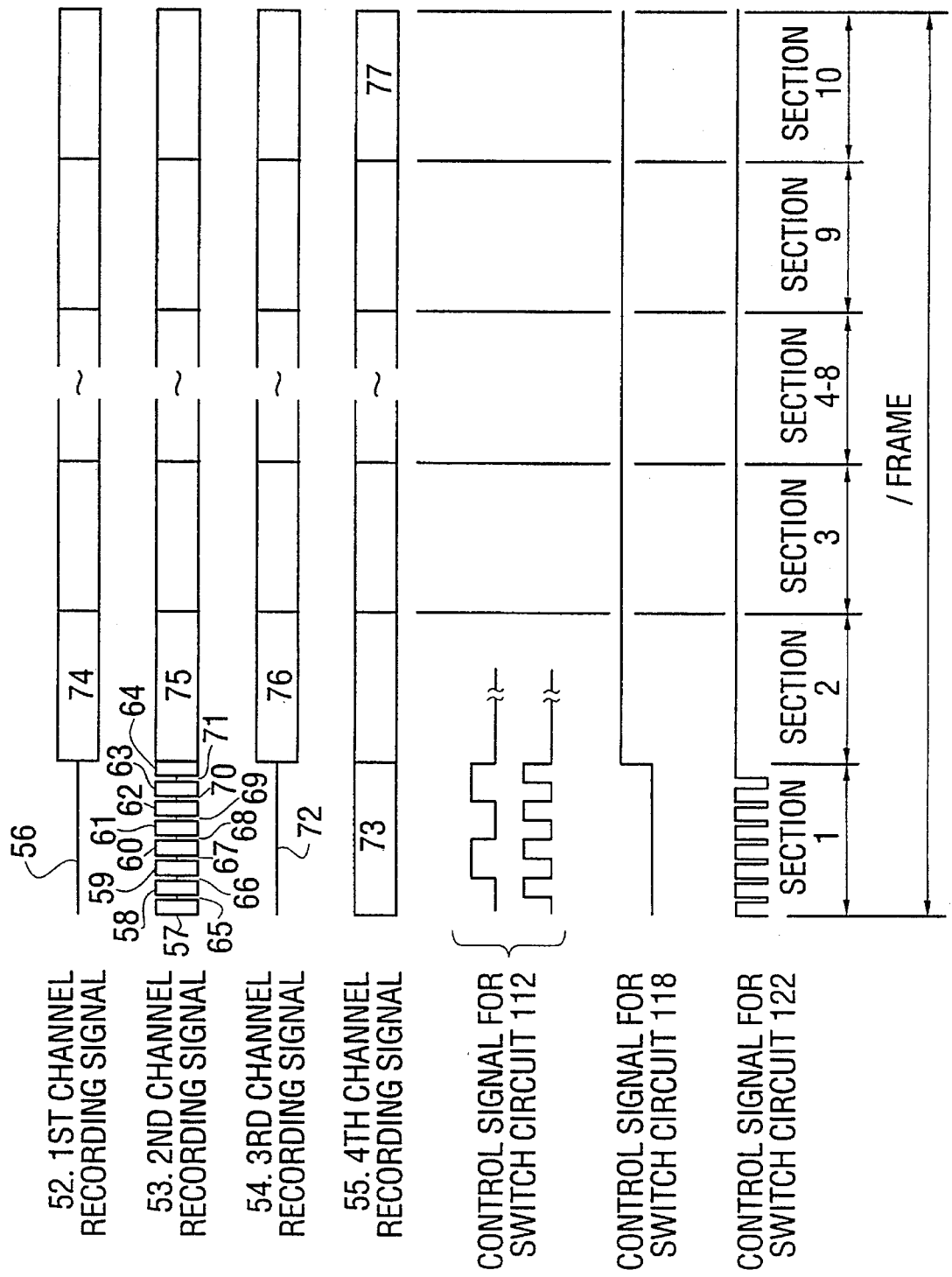

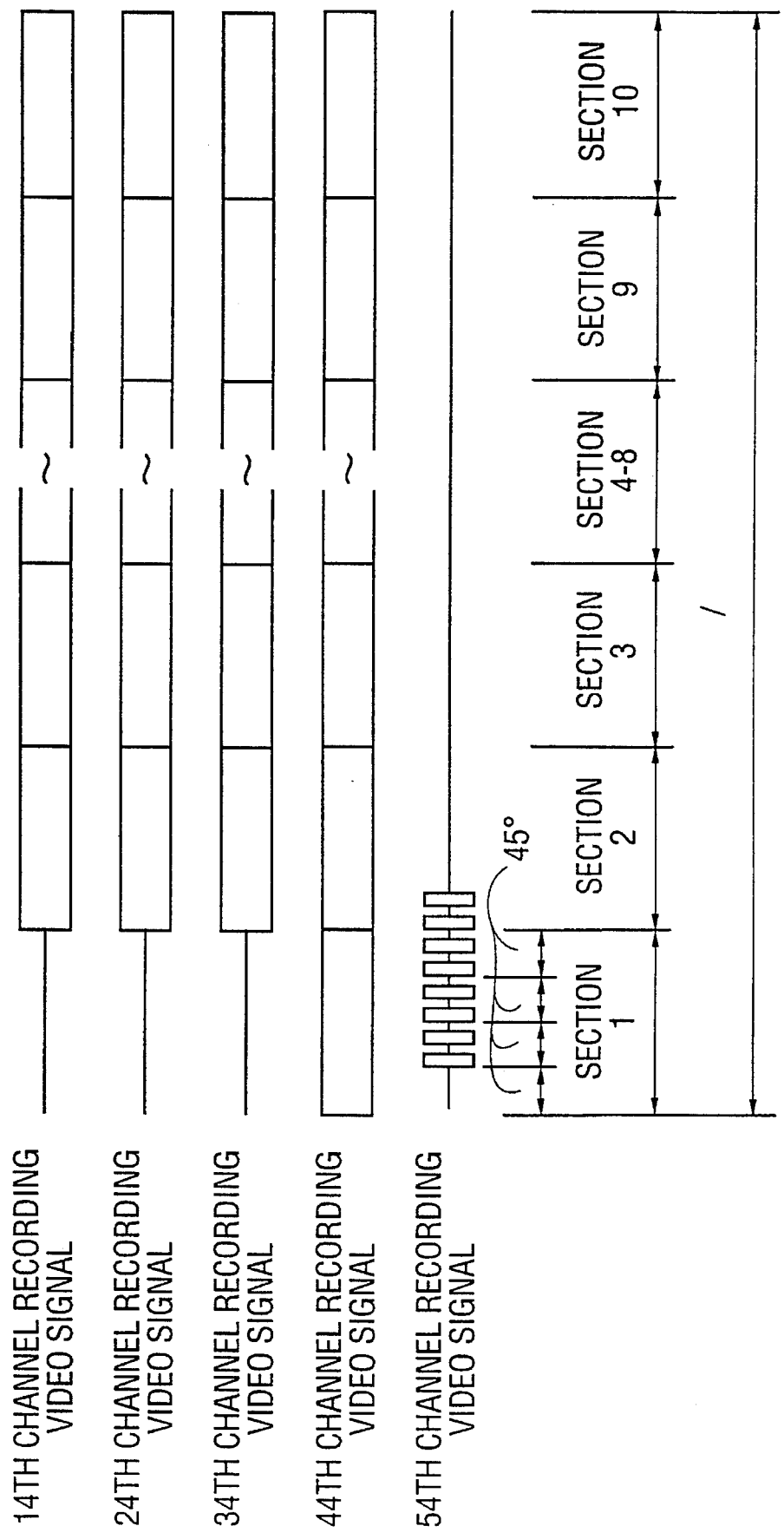

5,457,579

APPARATUS FOR RECORDING EACH EDITING UNIT OF VIDEO AND AUDIO SIGNALS IN AN ISOLATED AREA ON A RECORDING MEDIUM

This application is a continuation of now abandoned application Ser. No. 07/729,582, filed on Jul. 15, 1991.

BACKGROUND OF THE INVENTION

1. Field of the Invention

This invention relates to a recording/reproducing apparatus which records video and audio signals and is particularly suitable for high-quality editing of the records on narrow tracks.

2. Description of the Prior Art

It is a common practice for a video tape recorder (hereinafter abbreviated as a VCR) to eliminate guard bands between the video tracks on a recording medium by means of an azimuth loss for more efficient use of a tape. Moreover, improved performances of a recording medium and a magnetic head have accelerated a trend toward a narrower width recording track.

Editing the records on these narrow tracks may, however, be accompanied by a tracking error inducing an error of the track linearity due to inexact mechanical fitting or adjustment error, and a pitch error due to inaccurate tape feeding at the time of editing, etc. This tracking error deteriorates the continuity of a tape pattern at the beginning and/or end of an edited point, causing a reduction in recording track width or incomplete erasure of the signals intended to be edited.

This deterioration of a tape pattern diminishes the reproduction signal amplitude at the edited point and/or invites disturbed signals, resulting in some problems including disturbances of a reproduced image at the beginning or end of an edited point and an error rate increase during digital recording.

A VCR used for editing in particular, in which a track pitch cannot be diminished to secure editing performances still fails to avail itself of the improved performances of a recording medium and a magnetic head which have realized narrower tracks.

Some of the methods of securing editing performances for the records on these narrow tracks have already been disclosed in the Japanese Laid-open Patent Application No. 1-106382 (1989) and No. 2-214001 (1990).

Japanese Laid-open Patent Application No. 1-106382 describes a rotary-head magnetic recording/reproducing apparatus, wherein recording signals are divided into editing units, the signals in each editing unit are recorded using more than one track, and one or more unrecorded editing tracks are provided in each editing unit on a recording medium.

In the above method, however, since N times (N is an integral number of 2 or more) the amount of recording signal information on a track is recorded as an editing unit and one or more recorded editing tracks are provided in each editing unit, in recording signals with a very small amount of information such as an audio signal, a time code signal, and other additional information, a tape is less efficiently used because of a greater portion of the unrecorded editing tracks in the whole area of the tape.

On the other hand, Japanese Laid-open Patent Application No. 2-214001 relates to a recording/reproducing apparatus, wherein a guard band is formed, when signals are recorded using a multi-channel head during each scan by a rotary-head cylinder by adjusting the height at which the head is mounted on the rotary cylinder, thereby allowing this guard band to absorb a tracking error at the time of editing.

The above method is effective when video tracks are formed in an editing unit by a single scan. A problem is, however, that, even in forming video tracks of signals in an editing unit by multiple scanning, a guard band is formed during each scan regardless of the editing points, resulting in less efficient use of a tape.

SUMMARY OF THE INVENTION

An object of this invention is to provide a video and audio signal recording/reproducing apparatus which secures the stability of images and voices at editing points and is suitable for narrow-track recording.

The object may be effected by providing a video and audio signal recording apparatus for recording video and audio signals on parallel tracks formed on a recording medium, comprising:

a means for dividing a video signal with respect to time into video signal editing units, each of the video signal editing units occurring within a unit period of time which is N times (N=1, 2, . . .) as long as an amount of time required for one field period of the video signal;

a means for dividing an audio signal into audio signal editing units, each of the audio signal editing units occurring within a specific period of time, the audio signal editing units being synchronized with the video signal editing units occurring within the unit periods of time; and a means for recording a signal contained in each of said video signal and audio signal editing units in each of fully independent areas on the recording medium such that any two of the fully independent areas adjacent to each other in a track width direction are separated from each other by an unrecorded area composed of L unrecorded tracks (L=1, 2, . .) and any two of the fully independent areas adjacent to each other in a track length direction are separated from each other by an unrecorded area having a specific length in the track length direction.

This invention can minimize the sum of tracks left unrecorded as its above-mentioned construction allows recording areas to be formed in accordance with various amounts of information to be recorded by leaving some tracks unrecorded in the crosswise and longitudinal directions of the track on a recording medium for each and every video and audio signal editing unit. Furthermore, this recording/reproducing apparatus secures the editing performances for narrow-track records by preventing any portion of the track from being left unrecorded without reducing the track width at an editing point even if edited after erasure with a head wider than the track width.

The object may also be effected by providing a video and audio signal recording apparatus for recording video and audio signals on parallel tracks formed on a recording medium, comprising:

a means for dividing a video signal with respect to time into video signal editing units, each of the video signal editing units occurring within a unit period of time which is N times (N=1, 2, . .) as long as an amount of time required for one field period of the video signal;

a means for dividing an audio signal into audio signal editing units, each of the audio signal editing units occurring within a specific period of time, the audio signal editing units being synchronized with the video signal editing units occurring within the unit periods of time;

a means for recording a video signal contained in each of said video signal editing units on Q consecutive tracks (Q=1, 2, . . .) on the recording medium to form an independent video recording area composed of the Q consecutive tracks while leaving two unrecorded areas which are respectively adjacent to opposite sides of said independent video recording area; and a means for recording an audio signal contained in each of said audio signal editing units on a single track which is adjacent to one of said two unrecorded areas on the recording medium to form independent audio recording areas on said single track such that any two of the independent audio recording areas adjacent to each other in a track length direction are separated from each other by an unrecorded area having a specific length in the track length direction.

The object may also be effected by providing a video and audio signal recording apparatus for recording video and audio signals on parallel tracks formed on a recording medium, comprising:

a means for dividing a video signal into video signal editing units, each of the video signal editing units occurring within a unit period of time which is N times (N=1, 2, . . .) as long as an amount of time regard for one field period of the video signal;

a means for dividing an audio signal into audio signal editing units, each of the audio signal editing units occurring within a specific period of time, the audio signal editing units being synchronized with the video signal editing units occurring within the unit periods of time;

a means for recording a video signal contained in each of said video signal editing units on Q consecutive tracks (Q=1, 2, . . .) each having a track length R2 on the recording medium to form an independent video recording area composed of the Q consecutive tracks while leaving a first unrecorded area composed of L unrecorded tracks between each two adjacent independent video recording areas and a second unrecorded area extended in a track length direction from the independent video recording area by a specified length R3; and a means for recording an audio signal contained in each of said audio signal editing units in an area extended in the track length direction from said second unrecorded area by a specified length R4 on the recording medium to form independent audio recording areas such that any two of the independent audio recording areas adjacent to each other are separated from each other by an unrecorded area.

The object may also be effected by providing a video and audio signal recording apparatus for recording video and audio signals on parallel tracks formed on a recording medium, comprising:

a means for dividing a video signal into video signal editing units, each of the video signal editing units occurring within a unit period of time which is N times (N=1, 2, . . .) as long as an amount of time required for one field period of the video signal;

a means for dividing an audio signal into audio signal editing units, each of the audio signal editing units occurring within a specific period of time, the audio signal editing units being synchronized with the video signal editing units occurring within the unit periods of time;

a means for recording a video signal contained in each of said video signal editing units on Q consecutive tracks (Q=1, 2, . . .) each having a track length R1 and L+1 consecutive tracks (L=1, 2, . . .) which are consecutive in a track width direction from the Q consecutive tracks and each of which has a track length R7 on the recording medium to form an independent video recording area composed of a first video recording area which is composed of the Q consecutive tracks and a second video recording area which is composed of the L+1 consecutive tracks while leaving a first unrecorded area composed of L unrecorded tracks between each two adjacent independent video recording areas and a second unrecorded area extended in a track length direction from said second video recording area by a specified length R6+R5, where R1=R7+R6+R5; and a means for recording an audio signal contained in each of said audio signal editing units in an area extended in the track length direction from an outermost track of the L+1 consecutive tracks in said second video recording area by the specified length R6+R5 on the recording medium to form independent audio recording areas such that any two of the independent audio recording areas adjacent to each other are separated from each other in the track length direction by an unrecorded area having a specified length in the track length direction and that an area extended in the track length direction from said outermost track by a length R6 is left unrecorded.

Lastly, the object may be effected by providing a video and audio signal recording apparatus for recording video and audio signals on parallel tracks formed on a recording medium, comprising:

a means for dividing a video signal into video signal editing units, each of the video signal units occurring within a unit period of time which is N times (N–1, 2, . . .) as long as an amount of time required for one field period of the video signal;

a means for dividing an audio signal into audio signal editing units, each of the audio signal editing units occurring within a specific period of time, the audio signal editing units being synchronized with the video signal editing units occurring within the unit periods of time;

a means for recording a video signal contained in each of said video signal editing units on Q consecutive tracks (Q=1, 2, . . .) each having a track width W1 on the recording medium to form an independent video recording area composed of the Q consecutive tracks while leaving an unrecorded area having a width of K×W1 (K=2, 3, . . .) in a track width direction between each adjacent two independent video recording areas; and a means for recording an audio signal contained in each of said audio signal editing units on a single track which is located at the middle of said unrecorded area between each two adjacent independent video recording areas and has a track width W2 satisfying a condition of W1<W2<K×W1 to form independent audio recording areas on said single track such that any two of the independent audio recording areas adjacent to each other in a track length direction are separated from each other by an unrecorded area having a specific length in the track length direction.

BRIEF DESCRIPTION OF THE DRAWINGS

FIG. 2 shows a signal processing block diagram of a recording/reproducing apparatus in the same embodiment.

FIG. 3 shows a timing of a recording signal supplied to each recording channel in the same embodiment.

FIG. 13 shows a timing of a recording signal supplied to each recording channel in the same embodiment.

DESCRIPTION OF THE PREFERRED EMBODIMENTS

Figure 1:
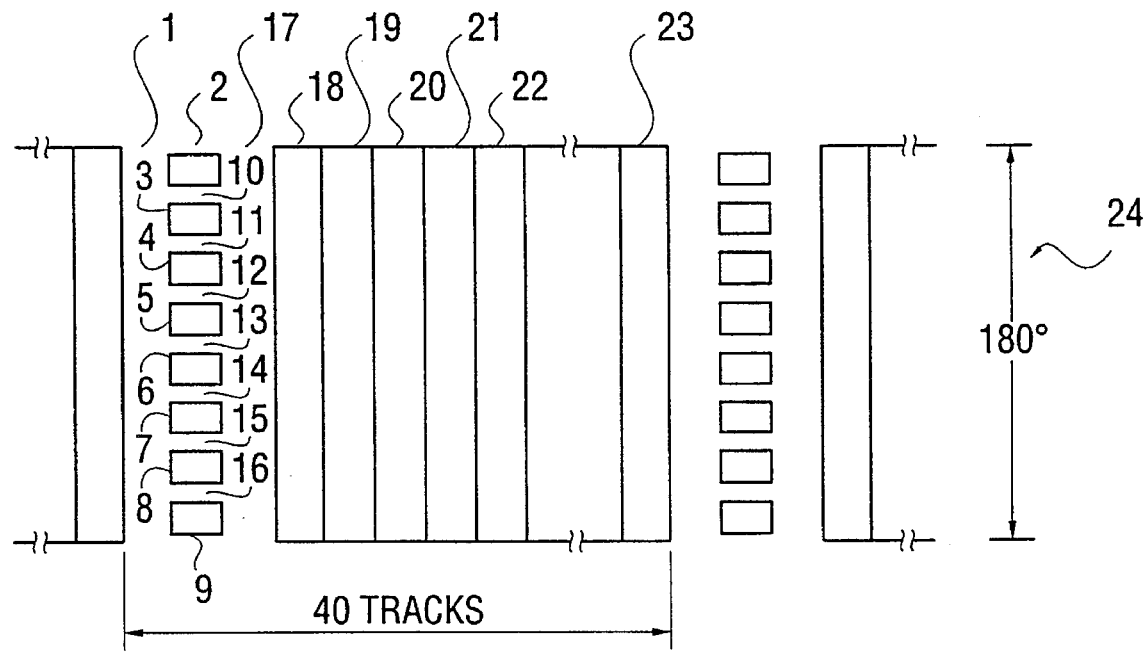
FIG. 1 shows a first recording track pattern in accordance with a first embodiment of this invention.
Figure 5:
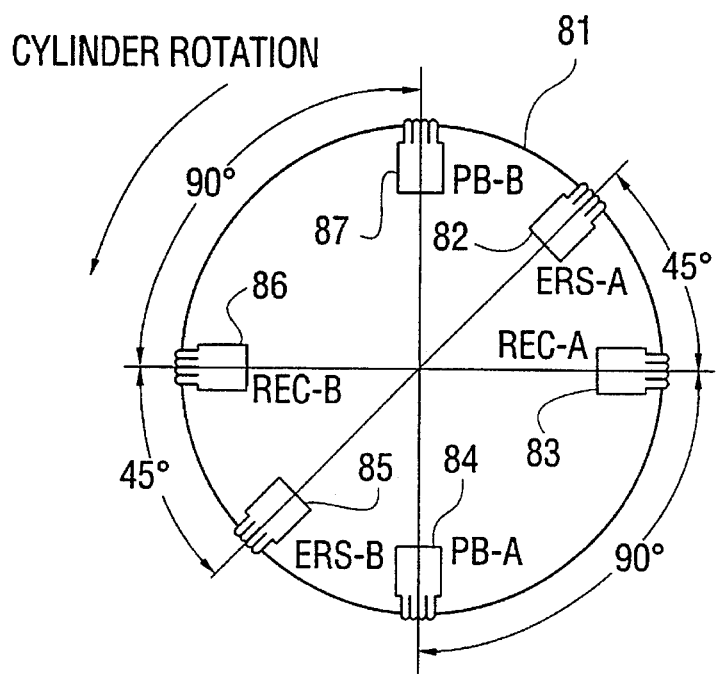
FIG. 5 shows a conceptual construction of a rotary cylinder in the same embodiment.

FIG. 1 shows a first recording track pattern in accordance with a first embodiment of the present invention; FIG. 2 is a recording signal processing block diagram of a recording/reproducing apparatus in the same embodiment, and FIG. 3 is a timing diagram of a recording signal supplied to each recording channel in the same embodiment. In this embodiment, a unit for editing a video signal or a unit period is defined as one frame; the number (P) of tracks formed on a recording medium in each of the unit periods is 40; the number (L) of tracks left unrecorded is 1; the number (Q) of tracks which the video signal contained in each unit period is 37; the number (M) of channels of the audio signal recorded is 4; and a unit for editing an audio signal of a specific period is a field of a video signal equivalent to ½ the unit period. Therefore, the audio signal contained in each unit period is recorded on 8 independent segments. A rotary cylinder is constructed as shown in FIG. 5 so that two 4-channel recording head blocks 83 and 86 are disposed to be apart by 180° from each other. The cylinder is rotated at a speed which is five times the frame frequency for recording. In FIG. 5, element 81 is a rotary cylinder; elements 83 and 86 are two 4-channel recording head blocks; elements 82 and 85 are two erase head blocks with a width twice that of the recording head, and elements 84 and 87 are two 4-channel reproducing head blocks.

In FIG. 1, elements 18 to 23 are 37 video recording tracks on which the video signal contained in one frame is recorded and elements 2 to 9 are 8 audio recording tracks on which the 4-channel audio signal is recorded. These tracks are separated by unrecorded tracks 1 and 17 and unrecorded tracks 10 to 16 of a specific length. Dimension 24 corresponds to a scanning period of 180°.

In the meantime, in FIG. 2, elements 25, 26, and 27 correspond to three terminals through which a luminance signal (Y) and two color difference signals (C1 and C2) are input respectively; elements 28, 29, 30, and 31 are four terminals through which a 4-channel audio signal is input; element 32 is a terminal through which a synchronizing signal is input; elements 33, 34, and 35 are three A/D converters which convert the Y, C1, and C2 signals respectively from an analog to a digital form; elements 36, 37, 38, and 39 are four A/D converters which convert the 4-channel audio signal from an analog to a digital form; element 40 is a first signal processing circuit (with its detailed construction shown in FIG. 6) which divides the Y, C1, and C2 signals converted into a digital form into each unit period of the video signal, and then distributes them to 4 recording channels, and adds outer error correcting codes, and otherwise processes them; element 41 is a second signal processing circuit (with its detailed circuit construction shown in FIG. 7) which divides each of the 4 channel signals converted into a digital form into each specific period, equivalent to ½ the unit period, and adds outer error correcting codes and performs other processes on each of them; element 42 is a timing signal generating circuit which generates a clock signal, various timing signals, and a memory address signal out of a horizontal and a vertical synchronizing signal detected from the synchronizing signal input; element 43 is a third signal processing circuit which processes the video signal distributed to the first channel by the addition of inner error correcting codes, a SYNC (synchronizing) signal and ID (identification data) and provides modulation and supplies a recording signal to the recording head 47 of the first channel while switching between the states of unrecorded and recorded video data; element 44 is a fourth signal processing circuit (with its detailed construction shown in FIG. 8) which processes the video signal distributed to the second recording channel and the audio signal output from the second signal processing circuit 4 by the addition of inner error correcting codes, a SYNC signal, and ID and provides modulation and supplies a recording signal to the recording head of the second channel while switching among the states of unrecorded, recorded video data, and recorded audio data; element 45 is a fifth signal processing circuit which processes the video signal distributed to the third channel by the addition of inner error correcting codes, a SYNC signal, and ID and provides modulation and supplies a recording signal to the recording head 49 of the third channel while switching between the states of unrecorded and recorded video data; element 46 is a sixth signal processing circuit which processes the video signal distributed to the fourth channel by the addition of inner error correcting codes, a SYNC signal, and ID and provides modulation and supplies a recording signal to the recording head 50 of the fourth channel; element 51 is a recording medium. The recording heads 47, 48, 49, and 50 of the four channels correspond to the two 4-channel heads of the head blocks 83 and 86 diametrically opposed to each other on the rotary cylinder.

In FIG. 3, elements 52, 53, 54, and 55 are recording signals of the first to the fourth channel supplied to the 4 recording heads. In the same figure, an unrecorded state 56 of the first channel recording signal 52 corresponds to an unrecorded track 1; a recording signal 74 corresponds to a video recording tack 19, and recording signals 57, 58, 59,

60, 61, 62, 63, and 64 of the second channel recording signal 53 correspond to audio tracks 9, 8, 7, 6, 5, 4, 3, and 2 respectively; unrecorded states 65, 66, 67, 68, 69, 70, and 71 correspond to unrecorded tracks 16, 15, 14, 13, 12, 11, and 10 of specific length respectively, and a recording signal 75 corresponds to a video recording tack 20. Meanwhile, an unrecorded state 72 of the third channel recording signal 53 and a recording signal 76 correspond to an unrecorded track 17 and a video recording track 21 respectively, and recording signals 73 and 77 of the fourth channel recording signal 55 corresponds to video recording tracks 18 and 23 respectively.

Figure 6:
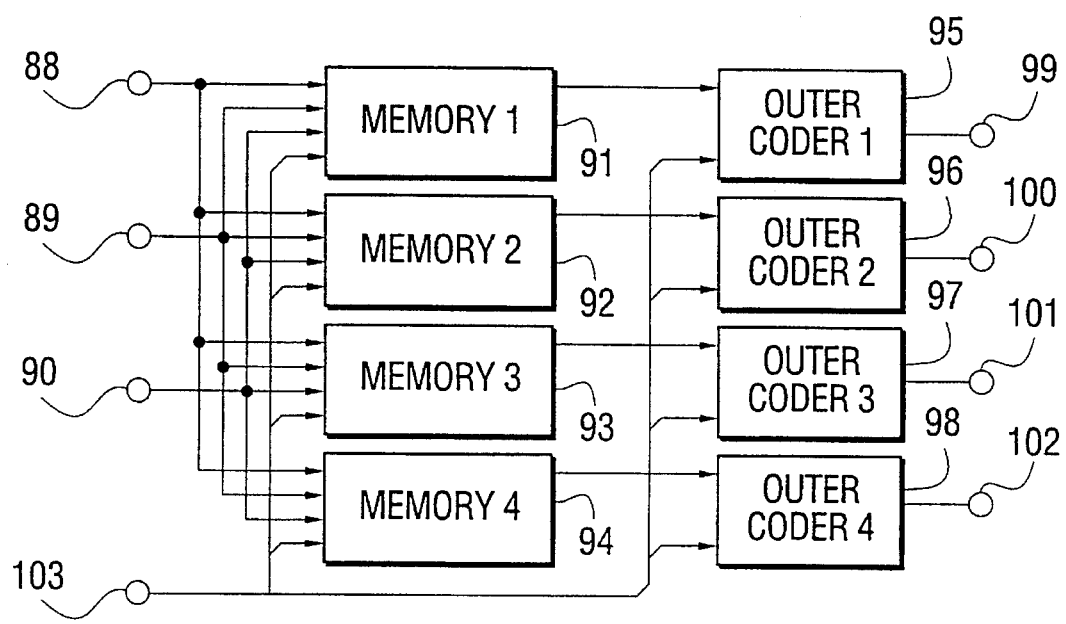
FIG. 6 shows a block diagram of the first signal processing circuit in the same embodiment.

The operation of the above-constructed recording/reproducing apparatus in accordance with the first embodiment of this invention follows. Each of the Y, C1, and C2 signals input from terminals is converted into a digital form and input into the first signal processing circuit 40. The first signal processing circuit 40 is constructed as shown in FIG. 6 and, through input terminals 88, 89, and 90 in the same figure, video data (Y, C1, and C2 signals) is distributed to four recording channels in each frame and written into the first, second, third, and fourth memories 91, 92, 93, and 94. In this case, the video data distributed to the first channel is written into the first memory 91; the video data distributed to the second channel is written into the second memory 92; the video data distributed to the third channel is written into the third memory 93; and the video data distributed to the fourth channel is written into the fourth memory 94, and all the stored data is read out of each memory in order. The above memories are controlled by a timing and a memory address signal output from the timing generation circuit 42 and input through an input terminal 103. To the video data output from each of the memories, outer error correcting codes are added using an outer coder 95, 96, 97, or 98 appropriate for each recording channel. FIG. 3 shows the timing of a recording signal supplied to a recording head, and the video data are output through output terminals 99, 100, 101, and 102 to the section 2 to 10 of the first to third channel recording signals and the sections 1 to 10 of the fourth channel recording signal.

Figure 7:
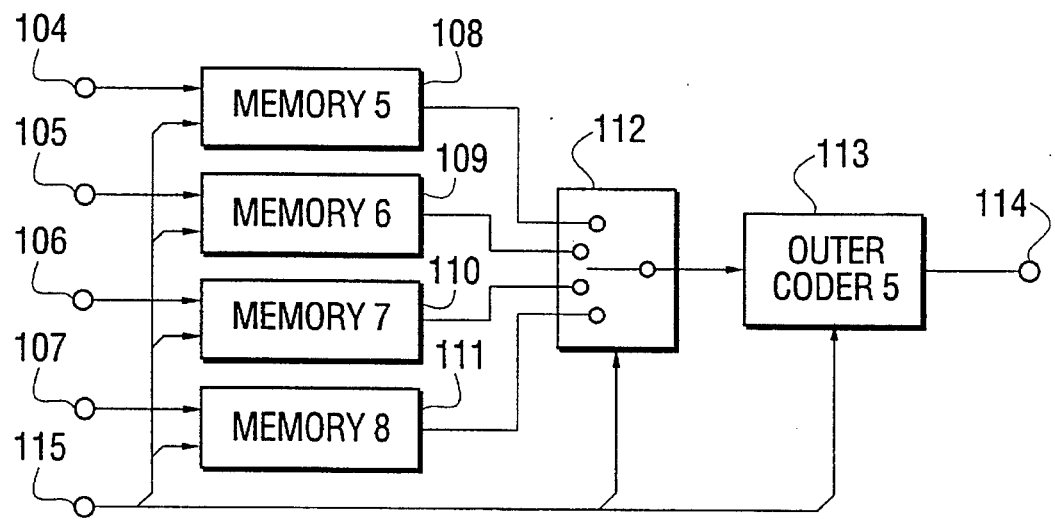
FIG. 7 shows a block diagram of the second signal processing circuit in the same embodiment.

The 4-channel audio signals are converted into a digital form by A/D converters 36, 37, 38, and 39 respectively, and processed by the second signal processing circuit. FIG. 7 is a block diagram showing a circuit construction of the second signal processing circuit and, using the same figure, the second signal processing circuit is described below. The audio data converted into a digital form is input to terminals 104, 105, 106, and 107 respectively and written into the fifth, sixth, seventh, and eighth memories 108, 109, 110, and 111 respectively. The audio data per field of each channel is subject to time base compression to be read out of memories at a specific timing by a timing and address signal output from the timing signal generation circuit 42 and input through an input terminal 115 and undergoes time domain multiplexing by a switch circuit 112. Outer error correcting codes are added by the fifth outer coder 113. Eight pieces of audio data in the section 1 of the second channel recording signal shown in FIG. 3 are 4-channel audio data in each field period, and audio data 57 and 61, 58 and 62, 59 and 63, and 60 and 64 are those data from the fifth, sixth, seventh, and eighth memories 108, 109, 110, and 111 respectively. They have already undergone time domain multiplexing by a control signal (2-bit binary code of a switch circuit 112).

Figure 8:
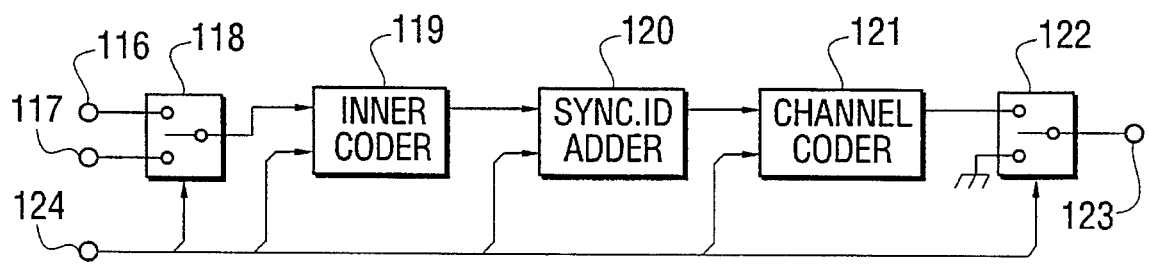
FIG. 8 shows a block diagram of the fourth signal processing circuit in the same embodiment.

FIG. 8 is a block diagram showing a circuit construction of the fourth signal processing circuit 44. The fourth signal processing circuit 44 provides the video data input through an input terminal 116 and distributed to the second recording channel and the audio data output from the above second signal processing circuit 41 and input through an input terminal 117 with time domain multiplexing by a switch circuit 118 and other processes including the addition of inner error correcting codes, a SYNC signal, and ID and provides modulation, and supplies a recording signal to the second recording head through an input terminal 124 while switching among the states of unrecorded, recorded video data, and recorded audio data by a switch circuit 122. Each of these signal processing circuits is controlled by a control signal output from the timing signal generation circuit 42 and input through an input terminal 124. The control signals of the switch circuits 118 and 122 are shown in FIG. 3.

The third, fifth, and sixth signal processing circuits 43, 45, and 46 have a construction of the fourth signal processing circuit 44 from which the switch circuit 118 is omitted and process the video data divided into each of the above channels by the addition of error correcting codes, a SYNC signal, and ID and provides modulation and supply a recording signal to the recording heads 47, 49, and 50 of the first, third, and fourth channels. In this way, the video and audio data are formed via each of recording heads 47, 48, 49, and 50 into a recording pattern shown in FIG. 1 and recorded on a recording medium 51.

Figure 4A:
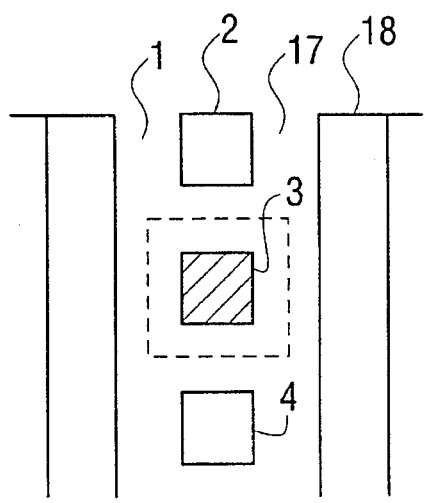
FIGS. 4(a)–4(b) show a track pattern of an audio signal edited by insertion in the same embodiment.
Figure 4B:
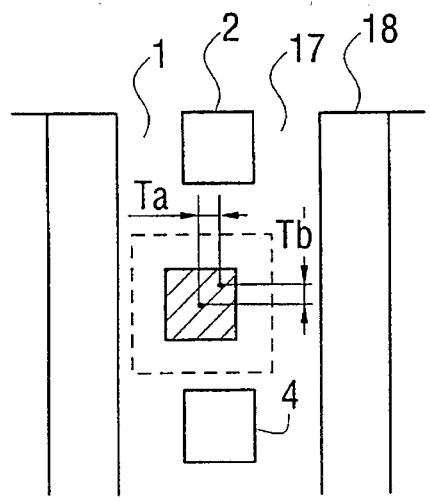

Next, using FIGS. 4(a)–4(b), editing of an audio recording track 3 by insertion is described below. The audio data recorded on this audio recording track is the audio data in a 1-field period of the third channel. FIG. 4(a) shows insertion editing with no tracking or timing error, and a segment enclosed by a dotted line is the segment erased using an erase head of width twice that of a recording head and a segment shadowed with slashes is the audio recording track recorded by insertion. FIG. 4(b) shows a track pattern editing by insertion with a tracking error of Ta and a timing error of Tb. A segment erased and an audio recording track edited by insertion are shown in the same manner as in FIG. 4(a). If a tracking error Ta at the time of editing is ±½ or less the specific unrecorded track length, editing is not accompanied by reduction in recording track width or generation of any recording track portion left unrecorded. Moreover, an audio recording track decentered by insertion editing can be safely reproduced if a reproducing head (head blocks 84 and 85 in FIG. 5) is widened. The description of insertion editing of an audio signal in FIGS. 4(a)–4(b) also holds true for a video signal.

According to the embodiment described above, since a video signal and a 4-channel audio signal are recorded on a recording medium by forming unrecorded tracks between the segments in which the video signal in each frame is used as an editing unit and the audio signal in each channel equivalent to the video signal field period are recorded in the crosswise and longitudinal directions of the track on a recording medium, insertion or assembly editing is not accompanied by reduction in recording track width or generation of any recording track portion left unerased even if an erase head wider than the track width at the time of editing. For this reason, even less exact mechanical fitting and adjustment and less accurate tape feeding at the time of editing can secure editing performances so that narrow-track recording may be particularly effective. This, therefore, enhances more efficient use of a tape as no widening of track width is required to secure editing performances and a recording trackwidth can be set to the minimum to secure the reproduction of a desired SNR (signal-to-noise ratio).

Moreover, since no data is recorded in the segment adjoining an audio recording track, a reproduced audio signal is subject to no deterioration of SNR due to jamming by neighboring cross-talk, enabling a high-performance audio signal to be reproduced.

Although this embodiment relates to a case where a video signal is recorded din a digital form, it is clear that similar effects can be obtained in case of analog recording.

It is also clear that the number of audio recording tracks per frame defined as 8 in this embodiment may be increased by further reducing the editing unit and that the audio signal recorded on the above 8 tracks may not correspond to the same frame as that of a video signal.

Moreover, the number of unrecorded tracks defined in this embodiment as 1 with a width of one track to be formed in the crosswise direction of the track on a recording medium may be increased to secure editing performances for further narrower tracks realized. The effects of this invention may also be obtained even with a recording track pattern as shown in FIG. 9 or 10.

Figure 9:
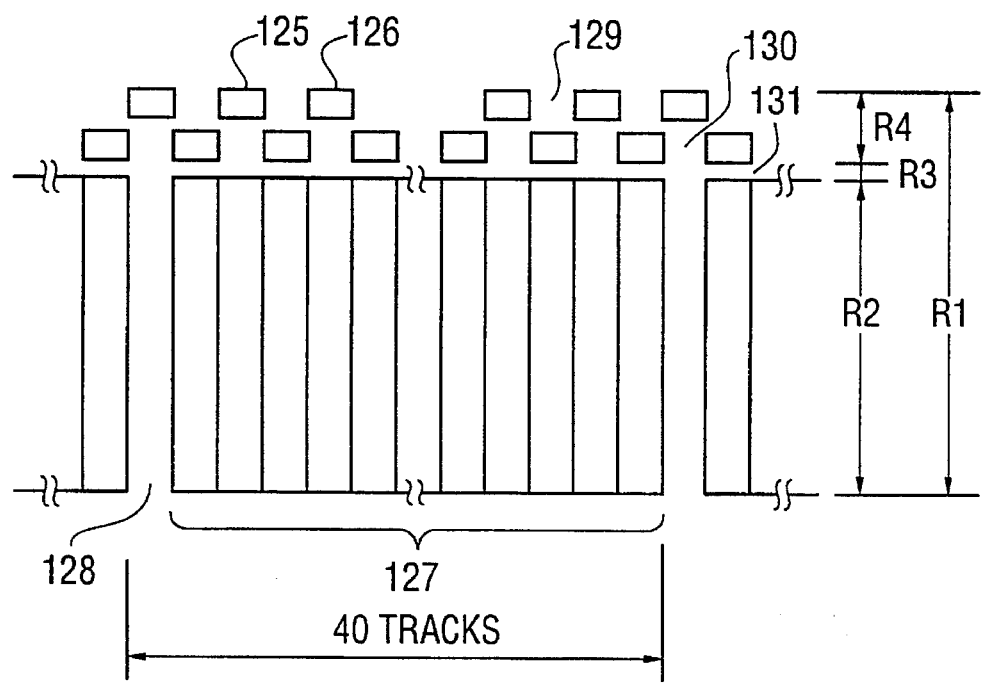
FIG. 9 shows a second recording track pattern that can produce similar effects to those in the same embodiment.

FIG. 9 relates to a case where, with the same cylinder construction as in the above noted embodiment, a unit for editing a video signal or a unit period is defined as 1 frame; the number (P) of tracks of length R1 formed on a recording medium in each unit is 40; the number (L) of unrecorded tracks of length R2 amount the track segments is 1; the number (P–L) of tracks of length R2 on which the video signal in each unit period is recorded is 39; the number (M) of channels of the audio signal recorded is 8; and a unit for editing an audio signal is a ⅕-frame period equivalent to ⅕ the unit period and the above audio signal in each frame recorded in the segment consisting of 40 tracks of length R4 is 40 independent audio recording tracks. In the same figure, elements 125, 126, etc. are audio recording tracks on which an audio signal in each ⅕-frame period is recorded; element 127 is 39 video recording tracks of length R2 on which a video signal in each frame is recorded; element 128 is an unrecorded track of length R2 which separates the recording segment for the video signal in each basic unit; elements 129 and 130 are unrecorded tracks which separate the recording segments for the audio signal in each editing unit, and element 131 is an unrecorded track of length R3 which separates the recording segment for the above video and audio signals.

Figure 10:
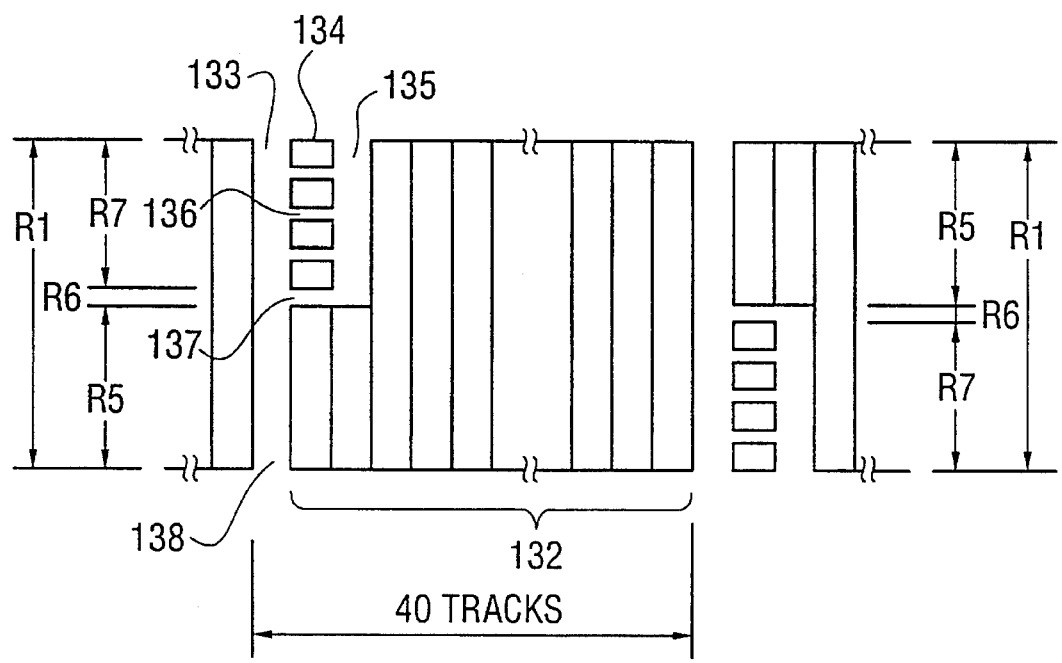
FIG. 10 shows a third recording track pattern that can produce similar effects to those in the same embodiment.

FIG. 10 shows a case where, with the same cylinder construction as in the above noted embodiment, a unit for editing a video signal or a unit period is defined as 1 frame; the number (P) of tracks of length R1 formed on a recording medium in each unit is 40; in each segment the video signal in each unit period is recorded on 37 tracks of length R1 and 2 tracks of length R5; the number (M) of channels of the audio signal recorded is 2; and a unit for editing an audio signal is ½ a unit period or a 1-field period and the audio signal in each unit period recorded in the segment consisting of a track of length R7 is 4 separated audio recording tracks. In the same figure, element 134 is an audio recording track on which a channel of an audio signal in a 1-field unit is recorded; element 132 is a video recording track on which a frame of video signal is recorded; element 136 is an unrecorded track which separates the recording segments for the audio signal in each editing unit; element 138 is an unrecorded track which separates the recording segments for the video signal in each basic unit; and elements 133, 135, and 137 are unrecorded tracks which separate the recording segments for the video and audio signals. In the same figure, the segment of an audio recording track is changed from one frame to another.

In this way, it is clear that this invention allows various recording track patterns to be used in accordance with the amount of information in each editing unit, not restricting its use to the above embodiments.

Figure 11:
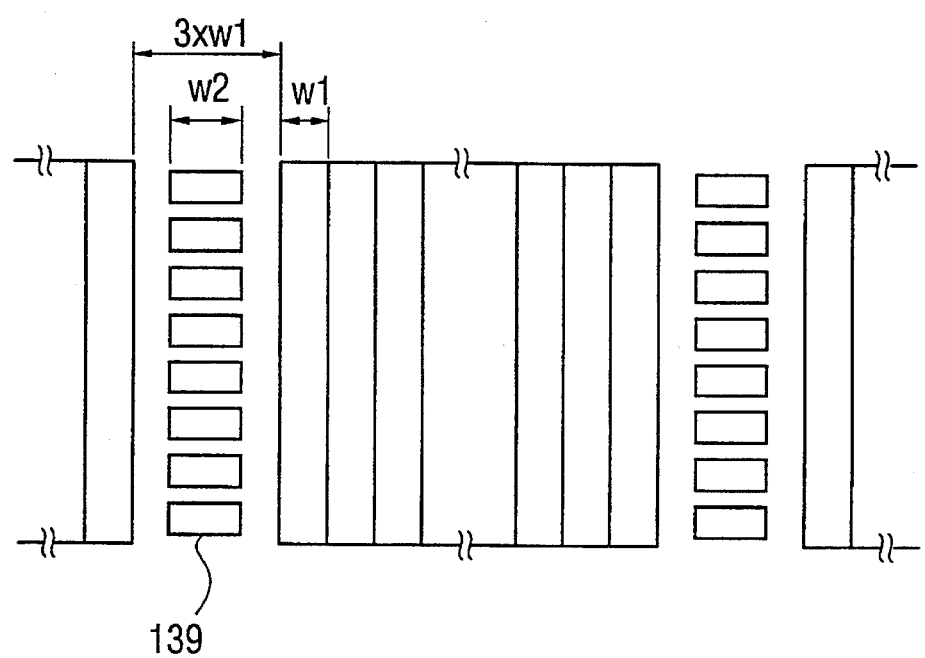
FIG. 11 shows a fourth recording track pattern in accordance with a second embodiment of this invention.
Figure 12:
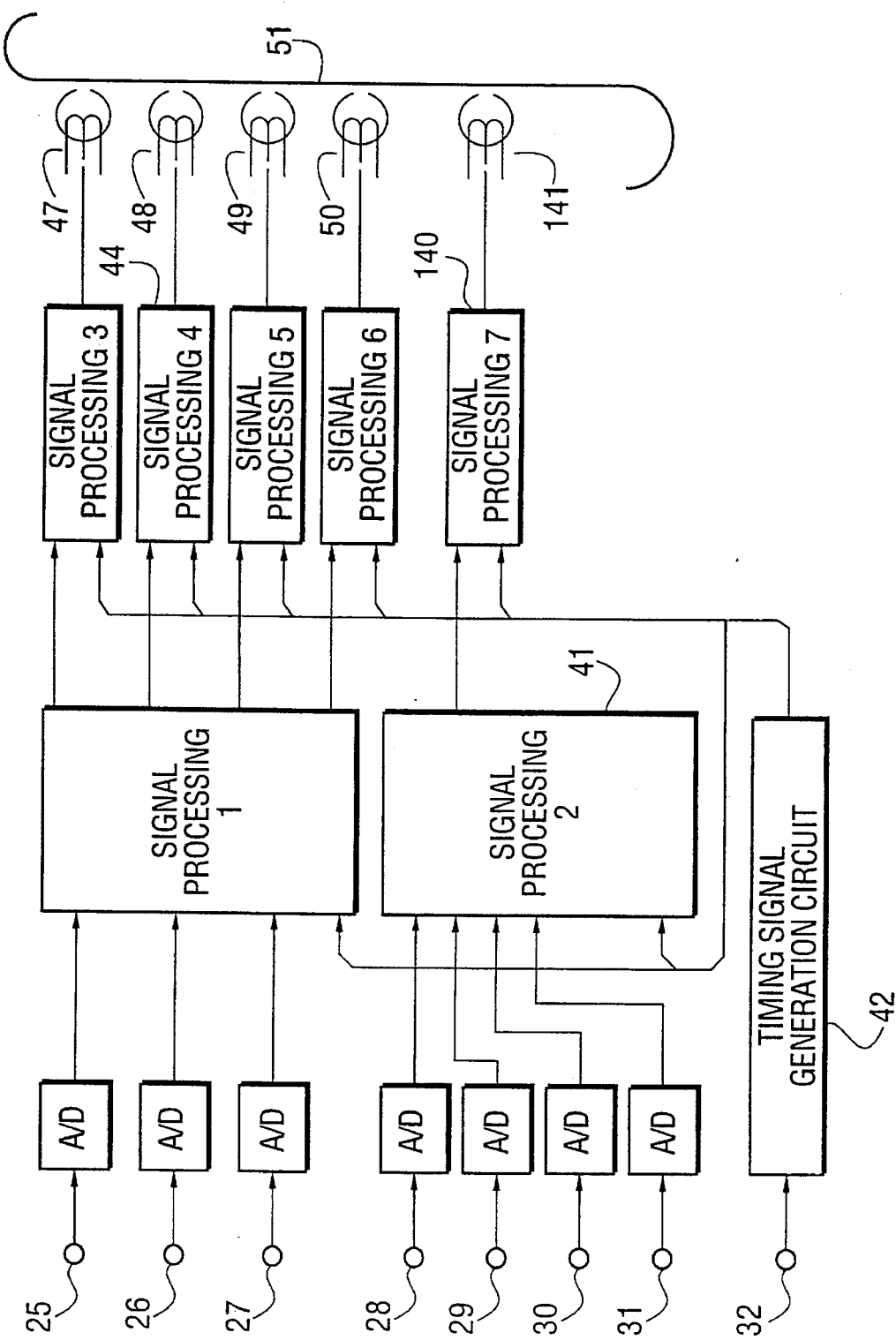
FIG. 12 shows a recording signal processing block diagram of a recording/reproducing apparatus in the same embodiment.

Next, the second embodiment of this invention is described below. FIG. 11 shows a recording track pattern in accordance with the second embodiment of this invention; FIG. 12 is a recording signal processing block diagram in accordance with this embodiment, and FIG. 13 shows the timing of a recording signal supplied to each recording channel in this embodiment. This embodiment differs from the first embodiment in that the width of a recording track for a video signal is W1, and the width W2 of an audio recording track on which an audio signal is recorded, is 1.5 times the video recording track width W1. In FIG. 11, element 139 is an audio recording track of width W2. In FIG. 12, element 140 is a seventh signal processing circuit which processes the audio signal output from the second signal processing circuit 41 by the addition of inner error correcting codes, a SYBC signal, and ID and provides modulation and supplies a recording signal while switching between the states of unrecorded and recorded audio data and element 141 is a fifth channel recording head (audio recording-dedicated head) with the same azimuth angle as the second channel recording head 48 and W2 width equivalent to a track width, mounted on a rotary cylinder at an angle of –45° with recording heads 47, 48, 49, and 50 (corresponding to head blocks 83 and 86) in the rotary direction of the cylinder.

The operation of an above-constructed recording/reproducing apparatus in this embodiment follows. The description of the video signal processing has ben omitted since it is the same as in the first embodiment. An audio signal is converted into a digital form by an A/D converter 28, 29, 30, or 31 appropriate for each channel. The 4-channel audio data are divided into each field unit by the second signal processing circuit 41, undergo time domain multiplexing after outer error correcting codes are added, and are output. The seventh signal processing circuit 140 processes the audio data output from the above second signal processing circuit 41 by the addition of inner error correcting codes, a SYNC signal, and ID and provides modulation and supplies a recording signal to the fifth channel recording head 141 while switching between the states of unrecorded and recorded audio data. The video data is recorded on a recording medium 51 as video recording tracks of width W1 via recording heads 47, 48, 49, and 50. The audio signal is recorded in the center of unrecorded tracks for the first to third channels as audio recording tracks of width W2.

FIG. 13 shows recording timings of these recording signals. As in the first embodiment, the video signal is recorded in accordance with a predetermined data format. The audio signal is supplied to the fifth channel recording head 141 as a signal delayed by the time equivalent to a difference in fitting angle (45°) between the fifth channel recording head 141 and recording heads 47, 48, 49, and 50.

According to this embodiment described above, since a video and an audio signal each in the editing unit is recorded i independent segments on a recording medium using a recording head of width W1 for the video signal and a recording head of width W2 (W1<W2<W3*W1) for the audio signal, any discontinuity in audio recording track center that may occur at the time of insertion editing of an audio signal is not only reduced but the performances of an audio signal may also be improved as the reproduction of better SNR is possible with a wider audio signal recording track. It is needless to say that even narrow-track recording may secure editing performances i this embodiment as in the first one.

Figure 14:
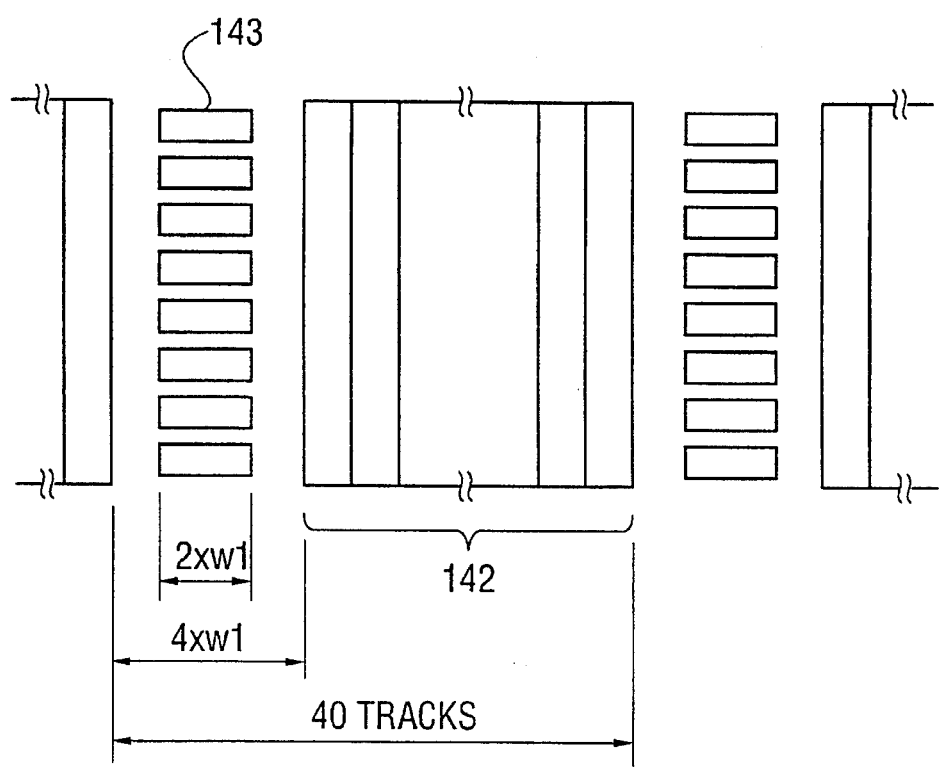
FIG. 14 shows a fifth recording track pattern that can produce similar effects to those in the same embodiment.

Meanwhile, FIG. 14 relates to a case where the width of an audio recording track 143 is twice that of a video recording track. In this case, a video signal is recorded on 36 video recording tracks 142.

We claim:

1. A video and audio signal recording apparatus for recording video and audio signals on parallel tracks formed on a recording medium, comprising:

a means for dividing a video signal with respect to time into video signal editing units, each of the video signal editing units occurring within a unit period of time which is N times (N=1, 2, . . .) as long as an amount of time required for one field period of the video signal;

a means for dividing an audio signal into audio signal editing units, each of the audio signal editing units occurring within a specific period of time, the audio signal editing units being synchronized with the video signal editing units occurring within the unit periods of time; and a recording means for recording a signal contained in each of said video signal and audio signal editing units in each of fully independent areas on the recording medium such that any two of the fully independent areas adjacent to each other in a track width direction are separated from each other by an unrecorded area composed of L unrecorded tracks (L=1, 2, . .) and any two of the fully independent areas adjacent to each other in a track length direction are separated from each other by an unrecorded area having a specific length in the track length direction;

wherein said recording means includes a recording head scanning said parallel tracks, and a means for supplying said video signal and audio signal editing units to said recording head while periodically inserting in a time domain multiplex manner an unrecorded period of time within which said video signal and audio signal editing units fail to occur so that said recording head forms said unrecorded area composed of L unrecorded tracks during said unrecorded period of time.

2. A video and audio signal recording apparatus for recording video and audio signals on parallel tracks formed on a recording medium, comprising:

a means for dividing a video signal with respect to time into video signal editing units, each of the video signal editing units occurring within a unit period of time which is N times (N=1, 2, . .) as long as an amount of time required for one field period of the video signal;

a means for dividing an audio signal into audio signal editing units, each of the audio signal editing units occurring within a specific period of time, the audio signal editing units being synchronized with the video signal editing units occurring within the unit periods of time;

a video signal recording means for recording a video signal contained in each of said video signal editing units on Q consecutive tracks (Q=1, 2, . . .) on the recording medium to form an independent video recording area composed of the Q consecutive tracks while leaving two unrecorded areas which are respectively adjacent to opposite sides of said independent video recording area;

wherein said video signal recording means includes a recording head scanning said parallel tracks, and a means for supplying said video signal editing units to said recording head while inserting in a time domain multiplex manner an unrecorded period of time within which said video signal editing units fail to occur before and after an occurrence of each of said video signal editing units so that said recording head forms said two unrecorded areas during said unrecorded period of time; and a means for recording an audio signal contained in each of said audio signal editing units on a single track which is adjacent to one of said two unrecorded areas on the recording medium to form independent audio recording areas on said single track such that any two of the independent audio recording areas adjacent to each other in a track length direction are separated from each other by an unrecorded area having a specific length in the track length direction.

3. A video and audio signal recording apparatus according to claim 2, wherein each of said two unrecorded areas adjacent to opposite sides of said independent video recording area is composed of L unrecorded tracks (L=1, 2, . . .), and wherein said means for dividing an audio signal includes a means for dividing each of M channel audio signals (M=1, 2, . . .) occurring within a specific period of time into audio signal editing units each occurring within a period of time equal to 1/R of the unit period of time (R=1, 2, . . .), and wherein said means for recording an audio signal includes a means for recording M channel audio signals of M×R audio signal editing units in each of said specific periods of time on a single track which is adjacent to one of the two unrecorded areas on the recording medium to form M×R independent audio recording areas on said single track such that any two of the independent audio recording areas adjacent to each other in a track length direction are separated from each other by an area having a specific length in the track length direction.

4. A video and audio signal recording apparatus for recording video and audio signals on parallel tracks formed on a recording medium, comprising:

a means for dividing a video signal into video signal editing units, each of the video signal editing units occurring within a unit period of time which is N times (N=1, 2, . . .) as long as an amount of time required for one field period of the video signal;

a means for dividing an audio signal into audio signal editing units, each of the audio signal editing units occurring within a specific period of time, the audio signal editing units being synchronized with the video signal editing units occurring within the Unit periods of time;

a video signal recording means for recording a video signal contained in each of said video signal editing units on Q consecutive tracks (Q=1, 2, . . .) each having a track length R2 on the recording medium to form an independent video recording area composed of the Q consecutive tracks while leaving a first unrecorded area composed of L unrecorded tracks between each two adjacent independent video recording areas and a second unrecorded area extended in a track length direction from the independent video recording area by a specified length R3;

wherein said video signal recording means includes a recording head scanning said parallel tracks, and a means for supplying said video signal editing units to said recording head while inserting in a time domain multiplex manner an unrecorded period of time within which said video signal editing units fail to occur between occurrences of each adjacent two of said video signal editing units so that said recording head forms said first unrecorded area during said unrecorded period of time; and a means for recording an audio signal contained in each of said audio signal editing units in an area extended in the track length direction from said second unrecorded area by a specified length R4 on the recording medium to form independent audio recording areas such that any two of the independent audio recording areas adjacent to each other are separated from each other by an unrecorded area.

5. A video and audio signal recording apparatus according to claim 4, wherein said means for dividing an audio signal includes a means for dividing each of M channel audio signals (M=1, 2, . . .) occurring within a specific period of time into audio signal editing units each occurring within a period of time equal to 1/R of the unit period of time (R=1, 2, . . .), and wherein said means fore recording an audio signal includes a means for recording M channel audio signals of M×R audio signal editing units in each of said specific periods of time to form M×R independent audio recording areas on said area having the specific length R4 such that any two of the independent audio recording areas adjacent to each other are separated from each other by an unrecorded area.

6. A video and audio signal recording apparatus for recording video and audio signals on parallel tracks formed on a recording medium, comprising:

a means for dividing a video signal into video signal editing units, each of the video signal editing units occurring within a unit period of time which is N times (N=1, 2, . . .) as long as an amount of time required for one field period of the video signal;

a means for dividing an audio signal into audio signal editing units, each of the audio signal editing units occurring within a specific period of time, the audio signal editing units being synchronized with the video signal editing units occurring within the unit periods of time;

a means for recording a video signal contained in each of said video signal editing units on Q consecutive tracks (Q=1, 2, . . .) each having a track length R1 and L+1 consecutive tracks (L=1, 2, . . .) which are consecutive in a track width direction from the Q consecutive tracks and each of which has a track length R7 on the recording medium to form an independent video recording area composed of a first video recording area which is composed of the Q consecutive tracks and a second video recording area which is composed of the L+1 consecutive tracks while leaving a first unrecorded area composed of L unrecorded tracks between each two adjacent independent video recording areas and a second unrecorded area extended in a track length direction from said second video recording area by a specified length R6+R5, where R1=R7+R6+R5; and a means for recording an audio signal contained in each of said audio signal editing units in an area extended in the track length direction form an outermost track of the L+1 consecutive tracks in said second video recording area by the specified length R6+R5 on the recording medium to form independent audio recording areas such that any two of the independent audio recording areas adjacent to each other are separated from each other in the track length direction by an unrecorded area having a specified length in the track length direction and that an area extended in the track length direction from said outermost track by a length R6 is left unrecorded.

7. A video and audio signal recording apparatus according to claim 6, wherein said means for dividing an audio signal includes a means for dividing each of M channel audio signals (M=1, 2, . . .) occurring within a specific period of time into audio signal editing units each occurring within a period of time equal to 1/R of the unit period of time (R=1, 2, . . .), and wherein said means for recording an audio signal includes a means for recording M channel audio signals of M×R audio signal editing units in each of said specific periods of time to form M×R independent audio recording areas on said area extended in the track length direction from said outermost track such that any two of the independent audio recording areas adjacent to each other are separated from each other in the track length direction by an unrecorded area having a specified length in the track length direction.

8. A video and audio signal recording apparatus for recording video and audio signals on parallel tracks formed on a recording medium, comprising:

a means for dividing a video signal into video signal editing units, each of the video signal units occurring within a unit period of time which is N times (N-1, 2, . . .) as long as an amount of time required for one field period of the video signal;

a means for dividing an audio signal into audio signal editing units, each of the audio signal editing units occurring within a specific period of time, the audio signal editing units being synchronized with the video signal editing units occurring within the unit periods of time;

a video signal recording means for recording a video signal contained in each of said video signal editing units on Q consecutive tracks (Q=1, 2, . . .) each having a track width W1 on the recording medium to form an independent video recording area composed of the Q consecutive tracks while leaving an unrecorded area having a width of K×W1 (K=2, 3, . . .) in a track width direction between each adjacent two independent video recording areas;

wherein said video signal recording means includes a recording head scanning said parallel tracks, and a means for supplying said video signal editing units to said recording head while inserting in a time domain multiplex manner an unrecorded period of time within which said video signal editing units fail to occur between occurrences of each adjacent two of said video signal editing units so that said recording head forms said unrecorded area during said unrecorded period of time; and a means for recording an audio signal contained in each of said audio signal editing units on a single track which is located at the middle of said unrecorded area between each two adjacent independent video recording areas and has a track width W2 satisfying a condition of W1<W2<K×W1 to form independent audio recording areas on said single track such that any two of the independent audio recording areas adjacent to each other in a track length direction are separated from each other by an unrecorded area having a specific length in the track length direction.

* * * * *